(12) United States Patent
Wang (10) Patent No.: US 11,178,347 B2
(45) Date of Patent: Nov. 16, 2021

(54) PHOTOSENSITIVE CIRCUIT AND DRIVING METHOD THEREFOR, AND DETECTION DEVICE AND DISPLAY DEVICE

(71) Applicant: BOE TECHNOLOGY GROUP CO., LTD., Beijing (CN)

(72) Inventor: Zhiliang Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/639,241

(22) PCT Filed: Apr. 23, 2019

(86) PCT No.: PCT/CN2019/083904
§ 371 (c)(1),
(2) Date: Feb. 14, 2020

(87) PCT Pub. No.: WO2019/210792
PCT Pub. Date: Nov. 7, 2019

(65) Prior Publication Data
US 2020/0213536 A1      Jul. 2, 2020

(30) Foreign Application Priority Data
May 4, 2018 (CN) .......................... 201810422094.X (51) Int. Cl.
*H04N 5/33* (2006.01)
*H04N 5/365* (2011.01)
*H04N 5/3745* (2011.01)

(52) U.S. Cl.
CPC ..................................... *H04N 5/33* (2013.01)

(58) Field of Classification Search
None
See application file for complete search history.

(56) References Cited

U.S. PATENT DOCUMENTS 5,227,887 A  * 7/1993 Dohi ................. H01L 27/14643
                                                 348/305
2005/0103982 A1* 5/2005 Sartori .............. H04N 5/35518
                                                 250/214.1
(Continued)

FOREIGN PATENT DOCUMENTS

CN        101943974 A        1/2011
CN        102081481 A        6/2011
(Continued)

OTHER PUBLICATIONS

International Search Report of PCT/CN2019/083904 in Chinese, dated Jul. 18, 2019, with English translation.

*Primary Examiner* — Hung Q Dang
(74) *Attorney, Agent, or Firm* — Collard & Roe, P.C.

(57) ABSTRACT

A photosensitive circuit and a driving method thereof, a detection device, and a display device are disclosed. The photosensitive circuit includes a reset sub-circuit, a compensation sub-circuit, a photosensitive sub-circuit, and a read sub-circuit. The reset sub-circuit is configured to provide an initial signal to a first node in response to a first control signal; the compensation sub-circuit is configured to compensate a level of the first node in response to a second control signal; the photosensitive sub-circuit is configured to receive incident light, supply a power supply voltage to the second node under control of the level of the first node, generate a sensing electrical signal based on the incident light, and provide the sensing electrical signal to the second node; and the read sub-circuit is configured to output the sensing electrical signal in response to a third control signal.

17 Claims, 8 Drawing Sheets

(56) References Cited

U.S. PATENT DOCUMENTS

| | | | |
|---|---|---|---|
| 2007/0109435 A1* | 5/2007 | Takahashi | H04N 5/374 |
| | | | 348/307 |
| 2010/0327148 A1* | 12/2010 | Chung | H01L 27/14643 |
| | | | 250/208.1 |
| 2011/0001711 A1 | 1/2011 | Choi et al. | |
| 2011/0128428 A1 | 6/2011 | Takatoku et al. | |
| 2016/0163259 A1 | 6/2016 | Kanda et al. | |
| 2017/0126994 A1 | 5/2017 | Duan et al. | |
| 2019/0043401 A1 | 2/2019 | Wang et al. | |
| 2020/0213536 A1 | 7/2020 | Wang | |

FOREIGN PATENT DOCUMENTS

| | | |
|---|---|---|
| CN | 103761002 A | 4/2014 |
| CN | 104867431 A | 8/2015 |
| CN | 107393505 A | 11/2017 |
| CN | 108735182 A | 11/2018 |

\* cited by examiner

| In an initialization stage, causing the reset sub-circuit to provide the initial signal to the first node in response to the first control signal; | S100 |
|---|---|
| In a compensation stage, causing the photosensitive sub-circuit to provide the power supply voltage to the second node under control of the level of the first node, and causing the compensation sub-circuit to compensate the level of the first node with the level of the second node in response to the second control signal until the level of the first node is equal to the target voltage; | S200 |
| In a read stage, causing the photosensitive sub-circuit, under control of the level of the first node, to generate the sensing electrical signal based on the incident light and provide the sensing electrical signal to the second node, and causing the read sub-circuit to output the sensing electrical signal in response to the third control signal. | S300 |

PHOTOSENSITIVE CIRCUIT AND DRIVING METHOD THEREFOR, AND DETECTION DEVICE AND DISPLAY DEVICE

CROSS REFERENCE TO RELATED APPLICATIONS

This application is the National Stage of PCT/CN2019/083904 filed on Apr. 23, 2019, which claims priority under 35 U.S.C. § 119 of Chinese Application No. 201810422094.X filed on May 4, 2018, the disclosure of which is incorporated by reference.

TECHNICAL FIELD

Embodiments of the present disclosure relate to a photosensitive circuit and a driving method thereof, a detection device, and a display device.

BACKGROUND

Vein recognition is an emerging infrared biometric technology. The main principle of vein recognition is to capture the vein distribution map of a certain part of a body, according to the characteristic of the near-infrared ray absorption of deoxyhemoglobin in venous blood, and the vein recognition can be applied in many fields such as medical treatment, mobile phones, safe payment, etc.

SUMMARY

At least one embodiment of the present disclosure provides a photosensitive circuit, which includes a reset sub-circuit, a compensation sub-circuit, a photosensitive sub-circuit, and a read sub-circuit. The reset sub-circuit is configured to provide an initial signal to a first node in response to a first control signal; the compensation sub-circuit is configured to compensate a level of the first node with a level of a second node in response to a second control signal; the photosensitive sub-circuit is configured to receive incident light, supply a power supply voltage to the second node under control of the level of the first node, generate a sensing electrical signal based on the incident light, and provide the sensing electrical signal to the second node; and the read sub-circuit is configured to output the sensing electrical signal in response to a third control signal.

For example, in the photosensitive circuit provided by an embodiment of the present disclosure, the reset sub-circuit is connected with a first control terminal, an initial signal terminal, and the first node, the first control terminal is configured to provide the first control signal, and the initial signal terminal is configured to provide the initial signal.

For example, in the photosensitive circuit provided by an embodiment of the present disclosure, the compensation sub-circuit is connected with the first node, the second node, a second control terminal, and a power supply voltage terminal, the second control terminal is configured to provide the second control signal; and the power supply voltage terminal is configured to provide the power supply voltage.

For example, in the photosensitive circuit provided by an embodiment of the present disclosure, the photosensitive sub-circuit is connected with the first node and the second node, in a case where the compensation sub-circuit is connected with the power supply voltage terminal, the photosensitive sub-circuit is further connected with the power supply voltage terminal.

For example, in the photosensitive circuit provided by an embodiment of the present disclosure, the read sub-circuit is connected with the second node, a third control terminal, and a read signal terminal, the third control terminal is configured to provide the third control signal, and the read signal terminal is configured to output the sensing electrical signal.

For example, in the photosensitive circuit provided by an embodiment of the present disclosure, the reset sub-circuit includes a first switching transistor, a control electrode of the first switching transistor is connected with the first control terminal, a first electrode of the first switching transistor is connected with the initial signal terminal, and a second electrode of the first switching transistor is connected with the first node.

For example, in the photosensitive circuit provided by an embodiment of the present disclosure, the compensation sub-circuit includes a second switching transistor and a storage capacitor, a control electrode of the second switching transistor is connected with the second control terminal, a first electrode of the second switching transistor is connected with the first node, and a second electrode of the second switching transistor is connected with the second node; and a first electrode of the storage capacitor is connected with the first node, and a second electrode of the storage capacitor is connected with the power supply voltage terminal.

For example, in the photosensitive circuit provided by an embodiment of the present disclosure, the photosensitive sub-circuit includes a photosensitive transistor, a control electrode of the photosensitive transistor is connected with the first node, a first electrode of the photosensitive transistor is connected with the second node, and a second electrode of the photosensitive transistor is connected with the power supply voltage terminal.

For example, in the photosensitive circuit provided by an embodiment of the present disclosure, the first electrode of the photosensitive transistor is a drain electrode of the photosensitive transistor, and the second electrode of the photosensitive transistor is a source electrode of the photosensitive transistor.

For example, in the photosensitive circuit provided by an embodiment of the present disclosure, the read sub-circuit includes a third switching transistor, a control electrode of the third switching transistor is connected with the third control terminal, a first electrode of the third switching transistor is connected with the second node, and a second electrode of the second switching transistor is connected with the read signal terminal.

For example, in the photosensitive circuit provided by an embodiment of the present disclosure, the reset sub-circuit is connected with a first control terminal, an initial signal terminal, and the first node, the first control terminal is configured to provide the first control signal, and the initial signal terminal is configured to provide the initial signal; the compensation sub-circuit is connected to the first node, the second node, a second control terminal, and a power supply voltage terminal, the second control terminal is configured to provide the second control signal, and the power supply voltage terminal is configured to provide the power supply voltage; the photosensitive sub-circuit is connected with the first node, the second node, and the power supply voltage terminal; and the read sub-circuit is connected with the second node, a third control terminal, and a read signal terminal, the third control terminal is configured to provide the third control signal, and the read signal terminal is configured to output the sensing electrical signal.

For example, in the photosensitive circuit provided by an embodiment of the present disclosure, the reset sub-circuit includes a first switching transistor, the compensation sub-circuit includes a second switching transistor and a storage capacitor, the photosensitive sub-circuit includes a photosensitive transistor, and the read sub-circuit includes a third switching transistor; a control electrode of the first switching transistor is connected with the first control terminal, a first electrode of the first switching transistor is connected with the initial signal terminal, and a second electrode of the first switching transistor is connected with the first node; a control electrode of the second switching transistor is connected with the second control terminal, a first electrode of the second switching transistor is connected with the first node, and a second electrode of the second switching transistor is connected with the second node; a first electrode of the storage capacitor is connected with the first node, and a second electrode of the storage capacitor is connected with the power supply voltage terminal; a control electrode of the photosensitive transistor is connected with the first node, a first electrode of the photosensitive transistor is connected with the second node, and a second electrode of the photosensitive transistor is connected with the power supply voltage terminal; and a control electrode of the third switching transistor is connected with the third control terminal, a first electrode of the third switching transistor is connected with the second node, and a second electrode of the third switching transistor is connected with the read signal terminal.

For example, in the photosensitive circuit provided by an embodiment of the present disclosure, the compensation sub-circuit is configured to compensate the level of the first node until the level of the first node is equal to a target voltage.

For example, in the photosensitive circuit provided by an embodiment of the present disclosure, in a case where the photosensitive sub-circuit includes a photosensitive transistor, and a second electrode of the photosensitive transistor is connected with a power supply voltage terminal, the target voltage is equal to a sum of the power supply voltage and a threshold voltage of the photosensitive transistor.

For example, in the photosensitive circuit provided by an embodiment of the present disclosure, the incident light includes an infrared light, and the photosensitive sub-circuit is configured to generate the sensing electrical signal based on the infrared light.

For example, in the photosensitive circuit provided by an embodiment of the present disclosure, the power supply voltage is a low-level voltage.

At least one embodiment of the present disclosure further provides a detection device, which includes a plurality of photosensitive circuits according to any one of embodiments of the present disclosure; the plurality of photosensitive circuits are arranged in an array.

For example, the detection device provided by an embodiment of the present disclosure further includes a detection circuit, and the detection circuit is connected with the photosensitive circuit, and configured to receive the sensing electrical signal.

At least one embodiment of the present disclosure further provides a display device, which includes a plurality of photosensitive circuits according to any one of embodiments of the present disclosure; the plurality of photosensitive circuits are arranged in an array.

For example, the display device provided by an embodiment of the present disclosure further includes a detection circuit, and the detection circuit is connected with the photosensitive circuit, and configured to receive the sensing electrical signal.

At least one embodiment of the present disclosure further provides a driving method of any one of photosensitive circuits provided by embodiments of the present disclosure, the driving method includes: in an initialization stage, causing the reset sub-circuit to provide the initial signal to the first node in response to the first control signal; in a compensation stage, causing the photosensitive sub-circuit to provide the power supply voltage to the second node under control of the level of the first node, and causing the compensation sub-circuit to compensate the level of the first node with the level of the second node in response to the second control signal until the level of the first node is equal to the target voltage; and in a read stage, causing the photosensitive sub-circuit, under control of the level of the first node, to generate the sensing electrical signal based on the incident light and provide the sensing electrical signal to the second node, and causing the read sub-circuit to output the sensing electrical signal in response to the third control signal.

For example, in the driving method provided by an embodiment of the present disclosure, in a case where the photosensitive sub-circuit includes a photosensitive transistor, the target voltage is equal to a sum of the power supply voltage and a threshold voltage of the photosensitive transistor.

BRIEF DESCRIPTION OF THE DRAWINGS

In order to clearly illustrate the technical solutions of the embodiments of the present disclosure, the drawings of the embodiments will be briefly described in the following; and it is obvious that the described drawings are only related to some embodiments of the present disclosure and thus are not limitative to the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. Also, the terms such as "a," "an" or "the" etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Those skilled in the art can understand that the switching transistors used in all embodiments of the present disclosure can be thin film transistors or field effect transistors or other devices with the same characteristics. Preferably, the transistors used in the embodiments of the present disclosure may be oxide semiconductor transistors. Because the source electrode and the drain electrode of the switching transistor used here are symmetrical, the source electrode and the drain electrode can be interchanged. In the embodiments of the present disclosure, in order to distinguish the two electrodes of the switching transistor except the gate electrode of the switching transistor, one of the two electrodes is referred to as the first electrode, and the other electrode is referred to as the second electrode, the first electrode may be a source electrode or a drain electrode, the second electrode may be a drain electrode or a source electrode, and the gate electrode is referred to as a control electrode. The photosensitive transistor adopted in the embodiments of the present disclosure can be a thin film transistor or a field effect transistor. The photosensitive transistor includes an N-type transistor, the N-type transistor is turned off when the voltage of the gate electrode is at a low level, and is turned on when the voltage of the gate electrode is at a high level.

For example, a detection device of vein identification includes a plurality of photosensitive circuits, and the photosensitive circuits each includes a switching transistor and a photosensitive transistor. The photosensitive circuit in the detection device can detect incident light, and generate a sensing electrical signal according to different intensities of the incident light, for example, the sensing electrical signal can be converted into an image for display.

According to the inventor's research, there may be differences in the characteristics of a plurality of photosensitive transistors in a plurality of photosensitive circuits in the detection device, which may cause differences in detection operations of the incident light, and may further affect the uniformity of display when the detection device is used for display.

Figure 1:
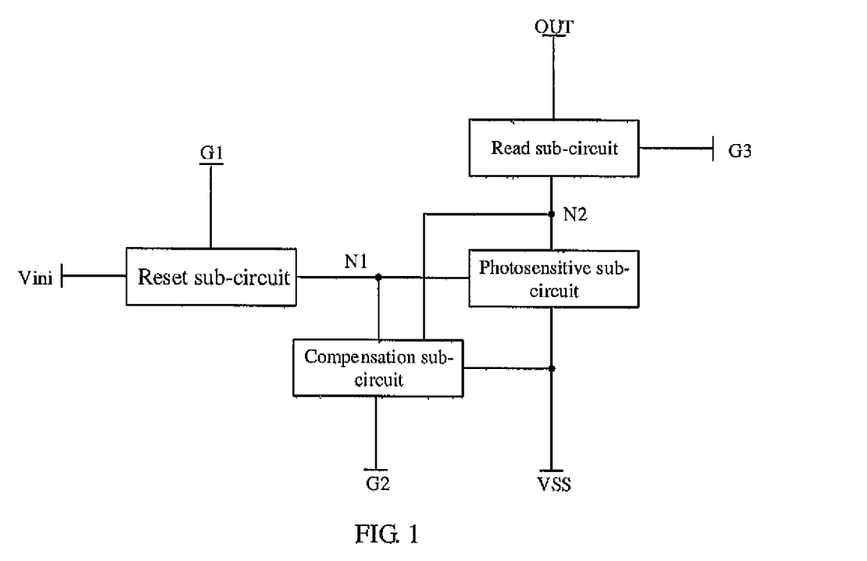
FIG. 1 is a structural schematic diagram of a photosensitive circuit provided by at least one embodiment of the present disclosure.

At least one embodiment of the present disclosure provides a photosensitive circuit, as shown in FIG. 1, and the photosensitive circuit includes a reset sub-circuit, a compensation sub-circuit, a photosensitive sub-circuit, and a read sub-circuit.

The reset sub-circuit is configured to provide an initial signal to a first node N1 in response to a first control signal. For example, as shown in FIG. 1, the reset sub-circuit is connected with a first control terminal G1, an initial signal terminal Vini, and the first node N1, the first control terminal G1 is configured to provide the first control signal, the initial signal terminal Vini is configured to provide the initial signal. For example, when the reset sub-circuit is turned on in response to the first control signal, the initial signal may be supplied to the first node N1, so a reset operation may be applied on the first node N1.

The compensation sub-circuit is configured to compensate a level of the first node N1 with a level of a second node N2 in response to a second control signal. For example, the level of the first node N1 is compensated until the level of the first node N1 is equal to a target voltage. For example, as shown in FIG. 1, the compensation sub-circuit is connected with the first node N1, the second node N2, a second control terminal G2, and a power supply voltage terminal VSS, the second control terminal G2 is configured to provide the second control signal, and the power supply voltage terminal VSS is configured to provide the power supply voltage. For example, when the compensation sub-circuit is turned on in response to the second control signal, the level of the first node N1 may be compensated with the level of the second node N2 until the level of the first node N1 is equal to the target voltage. It should be noted that in the embodiments of the present disclosure, the power supply voltage provided by the power supply voltage terminal VSS may be a low-level voltage.

The photosensitive circuit provided by at least one embodiment of the present disclosure can, for example, cause the level of the first node N1 equal to the target voltage by setting a compensation sub-circuit, before performing a photosensitive operation, so that, for example, a threshold voltage in the photosensitive sub-circuit can be compensated, and the uniformity during detection operation that is performed by a detection device (or a display device) including a plurality of photosensitive circuits can be improved.

The photosensitive sub-circuit is configured to receive incident light, supply a power supply voltage to the second node N2 under control of the level of the first node N1, generate a sensing electrical signal based on the incident light, and provide the sensing electrical signal to the second node N2. For example, as shown in FIG. 1, the photosensitive sub-circuit is connected to the first node N1, the second node N2, and the power supply voltage terminal VSS. For example, when the photosensitive sub-circuit is turned on under control of the level of the first node N1, the power supply voltage can be supplied to the second node N2. In addition, the photosensitive sub-circuit can further receive the incident light, generate the sensing electrical signal based on the incident light, and provide the sensing electrical signal to the second node N2.

The read sub-circuit is configured to output the sensing electrical signal in response to a third control signal. For example, as shown in FIG. 1, the read sub-circuit is connected to the second node N2, a third control terminal G3, and a read signal terminal OUT, the third control terminal G3 is configured to provide the third control signal, and the read signal terminal OUT is configured to output the sensing electrical signal. For example, when the read sub-circuit is turned on in response to the third control signal, the sensing electrical signal of the second node N2 can be output through the read signal terminal OUT.

The photosensitive circuit provided by the embodiment of the present disclosure may be integrated in a pixel circuit of a display device, for example, a plurality of photosensitive circuits may be arranged in an array. Therefore, the display device integrated with the photosensitive circuits can have both a display function and a photosensitive detection function, simultaneously. For example, the display device can be used in a biometric field, for example, used for vein recognition.

For example, in the embodiments of the present disclosure, the power supply voltage terminal VSS continuously provides a low-level voltage signal. The first control terminal G1, the second control terminal G2, and the third control terminal G3 provide pulse signals, and the initial signal terminal Vini may provide a DC (Direct Current) signal.

At least one embodiment of the present disclosure initializes the level of the first node N1 by setting the reset sub-circuit, so the influence of residual signals of a previous frame can be reduced or avoided.

At least one embodiment of the present disclosure ensures that the level of the first node N1 is maintained as the target voltage by setting the compensation sub-circuit. For example, the target voltage makes the sensing electrical signal, supplied by the photosensitive sub-circuit to the second node N2, to be only related to the intensity of the incident light, and not related to the characteristics of the photosensitive sub-circuit itself, such as a threshold voltage, etc.

For example, in at least one embodiment of the present disclosure, the incident light includes an infrared light, and the photosensitive circuit is configured to generate the sensing electrical signal based on the infrared light. For example, the incident light may be an infrared light, and may also be incident light including an infrared light. The embodiments of the present disclosure do not limit the type of the incident light.

At least one embodiment of the present disclosure provides a photosensitive circuit, and the photosensitive circuit includes a reset sub-circuit, a compensation sub-circuit, a photosensitive sub-circuit, and a read sub-circuit. The reset sub-circuit is connected with a first control terminal, an initial signal terminal, and a first node, the first control terminal is configured to provide a first control signal, and the initial signal terminal is configured to provide an initial signal. The reset sub-circuit is configured to provide the initial signal to the first node in response to the first control signal. The compensation sub-circuit is connected with the first node, a second node, a second control terminal, and a power supply voltage terminal, the second control terminal is configured to provide a second control signal, and the power supply voltage terminal is configured to provide a power supply voltage. The compensation sub-circuit is configured to compensate the level of the first node with the level of the second node in response to the second control signal until the level of the first node is equal to a target voltage. The photosensitive sub-circuit is connected with the first node, the second node, and the power supply voltage terminal. The photosensitive sub-circuit is configured to receive incident light, supply a power supply voltage to the second node under control of the level of the first node, generate a sensing electrical signal based on the incident light, and provide the sensing electrical signal to the second node. The read sub-circuit is connected with the second node, a third control terminal, and a read signal terminal, the third control terminal is configured to provide a third control signal, and the read signal terminal is configured to output the sensing electrical signal. The read sub-circuit is configured to output the sensing electrical signal in response to the third control signal.

Figure 2:
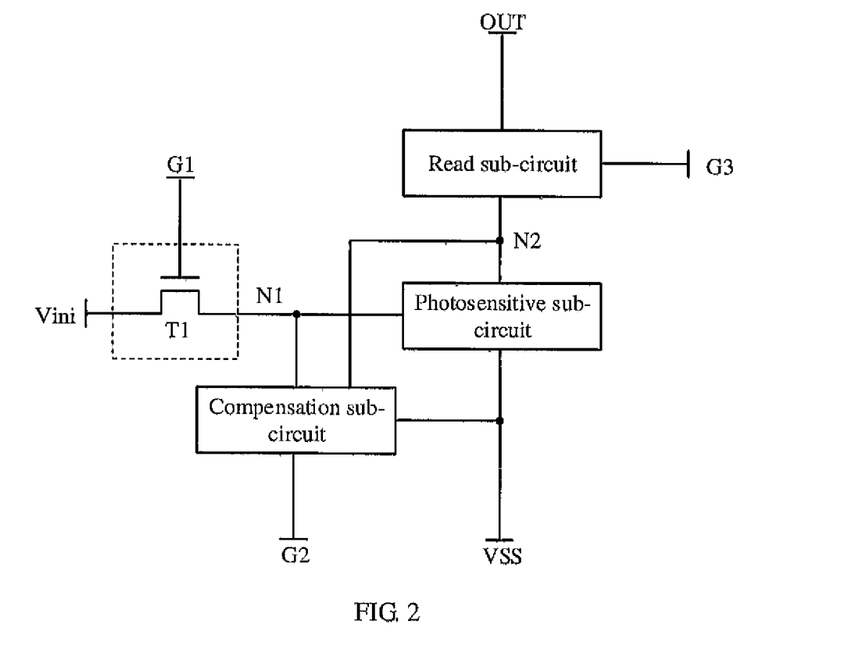
FIG. 2 is an equivalent circuit diagram of a reset sub-circuit provided by at least one embodiment of the present disclosure.

For example, FIG. 2 is an equivalent circuit diagram of a reset sub-circuit provided by at least one embodiment of the present disclosure. As shown in FIG. 2, the reset sub-circuit includes a first switching transistor T1.

As shown in FIG. 2, a control electrode of the first switching transistor T1 is connected to the first control terminal G1 to receive the first control signal, a first electrode of the first switching transistor T1 is connected to the initial signal terminal Vini to receive the initial signal, and a second electrode of the first switching transistor T1 is connected to the first node N1.

For example, the first switching transistor T1 may be an enhancement type transistor or a depletion type transistor, and the embodiments of the present disclosure is not limited thereto.

It should be noted that an exemplary structure of a reset sub-circuit is shown in FIG. 2. Those skilled in the art can easily understand that the implementation way of the reset sub-circuit is not limited to this embodiment, as long as its functions can be realized.

Figure 3:
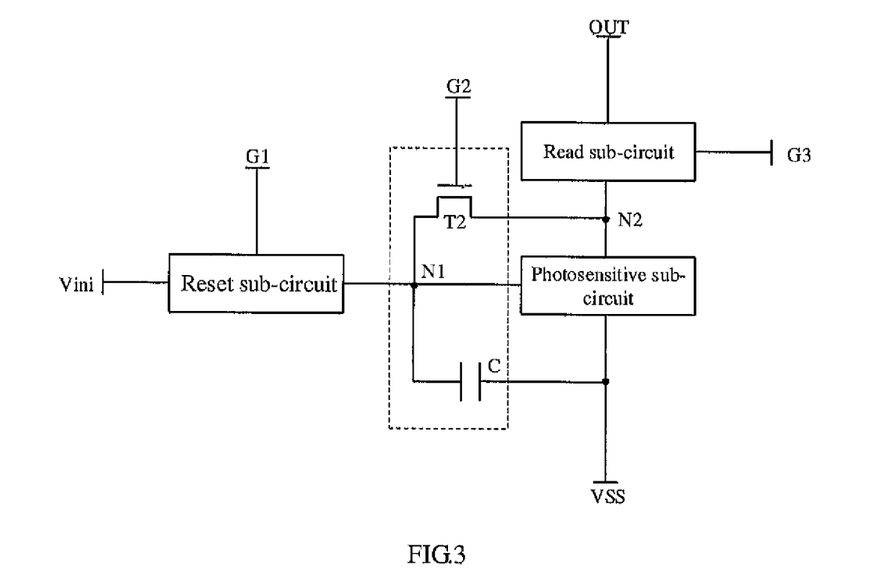
FIG. 3 is an equivalent circuit diagram of a compensation sub-circuit provided by at least one embodiment of the present disclosure.

For example, FIG. 3 is an equivalent circuit diagram of a compensation sub-circuit provided by at least one embodiment of the present disclosure. As shown in FIG. 3, the compensation sub-circuit includes a second switching transistor T2 and a storage capacitor C.

As shown in FIG. 3, a control electrode of the second switching transistor T2 is connected to the second control terminal G2 to receive the second control signal, a first electrode of the second switching transistor T2 is connected to the first node N1, a second electrode of the second switching transistor T2 is connected to the second node N2, a first electrode of the storage capacitor C is connected to the first node N1, and a second electrode of the storage capacitor C is connected to the power supply voltage terminal VSS to receive the power supply voltage.

For example, the second switching transistor T2 may be an enhancement type transistor or a depletion type transistor, and the embodiments of the present disclosure is not limited thereto.

It should be noted that an exemplary structure of a compensation sub-circuit is shown in FIG. 3. Those skilled in the art can easily understand that the implementation way of the compensation sub-circuit is not limited to this embodiment, as long as its functions can be realized.

Figure 4:
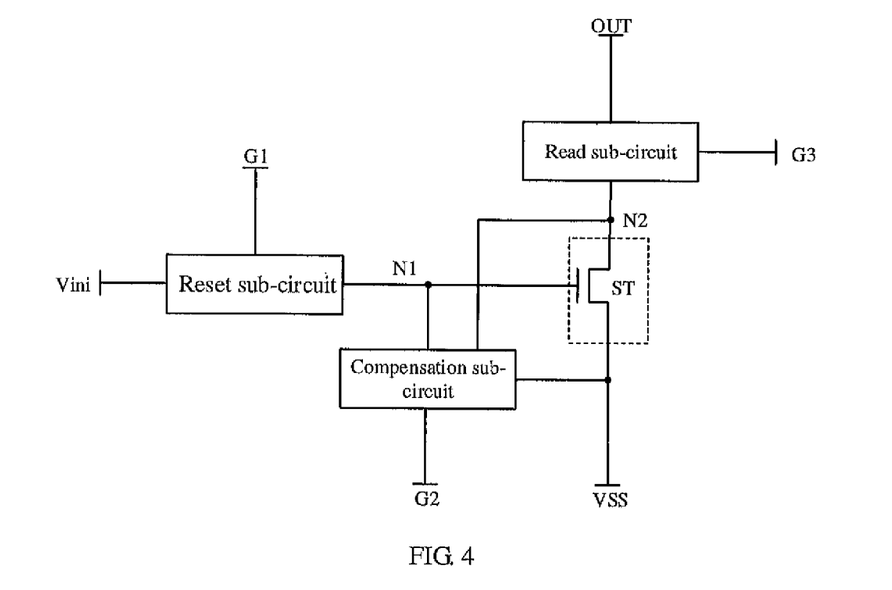
FIG. 4 is an equivalent circuit diagram of a photosensitive sub-circuit provided by at least one embodiment of the present disclosure.

For example, FIG. 4 is an equivalent circuit diagram of a photosensitive sub-circuit provided by at least one embodiment of the present disclosure. As shown in FIG. 4, the photosensitive sub-circuit includes a photosensitive transistor ST.

As shown in FIG. 4, a control electrode (for example, a gate electrode) of the photosensitive transistor ST is connected to the first node N1, a first electrode (for example, a drain electrode) of the photosensitive transistor ST is connected to the second node N2, and a second electrode (for example, a source electrode) of the photosensitive transistor ST is connected to the power supply voltage terminal VSS to receive the power supply voltage.

It should be noted that an exemplary structure of a photosensitive sub-circuit is shown in FIG. 4. Those skilled in the art can easily understand that the implementation way of the photosensitive sub-circuit is not limited to this embodiment, as long as its functions can be realized.

Figure 5:
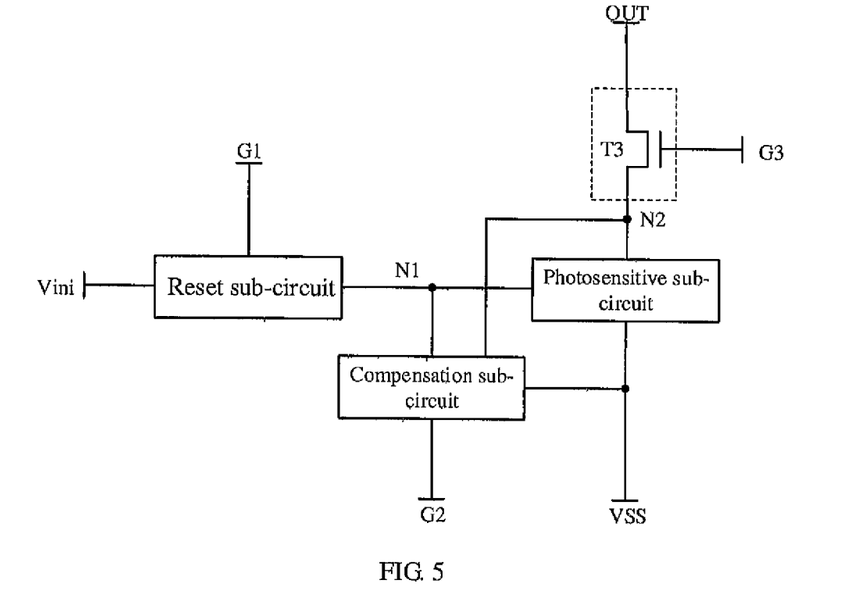
FIG. 5 is an equivalent circuit diagram of a read sub-circuit provided by at least one embodiment of the present disclosure.

For example, FIG. 5 is an equivalent circuit diagram of a read sub-circuit provided by at least one embodiment of the present disclosure. As shown in FIG. 5, the read sub-circuit includes a third switching transistor T3.

As shown in FIG. 5, a control electrode of the third switching transistor T3 is connected to the third control terminal G3 to receive the third control signal, a first electrode of the third switching transistor T3 is connected to the second node N2, and a second electrode of the third switching transistor T3 is connected to the read signal terminal OUT to output the sensing electrical signal.

For example, the third switching transistor T3 may be an enhancement type transistor or a depletion type transistor, and the embodiments of the present disclosure is not limited thereto.

It should be noted that an exemplary structure of a read sub-circuit is shown in FIG. 5. Those skilled in the art can easily understand that the implementation way of the read sub-circuit is not limited to this embodiment, as long as its functions can be realized.

Figure 6:
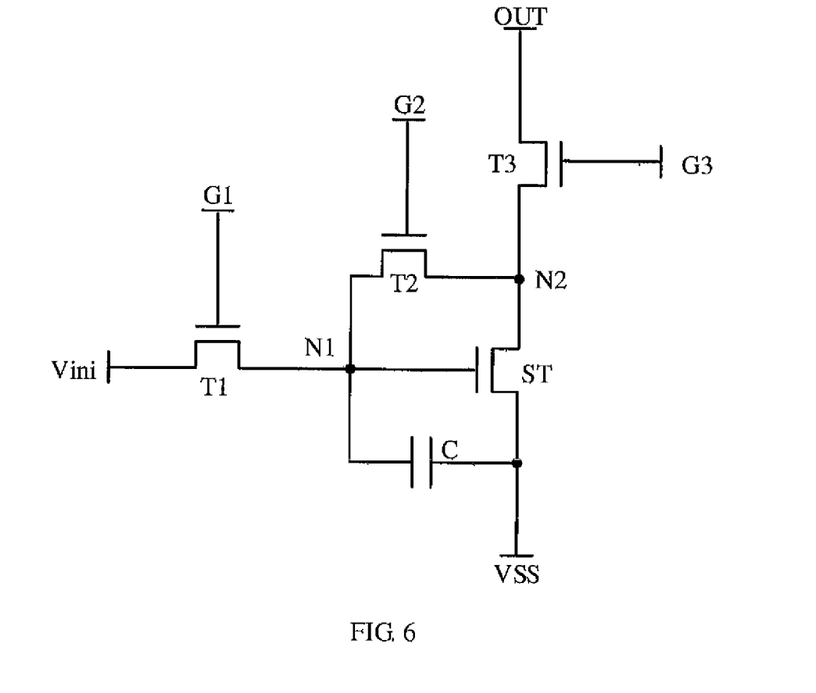
FIG. 6 is a circuit diagram of a photosensitive circuit provided by at least one embodiment of the present disclosure.

For example, FIG. 6 is a circuit diagram of a photosensitive circuit provided by at least one embodiment of the present disclosure. As shown in FIG. 6, in the photosensitive circuit provided by the embodiment of the present disclosure, the reset sub-circuit includes a first switching transistor T1, the compensation sub-circuit includes a second switching transistor T2 and a storage capacitor C, the photosensitive sub-circuit includes a photosensitive transistor ST, and the read sub-circuit includes a third switching transistor T3.

For example, as shown in FIG. 6, a control electrode of the first switching transistor T1 is connected to the first control terminal G1 to receive a first control signal, a first electrode of the first switching transistor T1 is connected to the initial signal terminal Vini to receive an initial signal, and a second electrode of the first switching transistor T1 is connected to the first node N1. A control electrode of the second switching transistor T2 is connected to the second control terminal G2 to receive a second control signal, a first electrode of the second switching transistor 12 is connected to the first node N1, and a second electrode of the second switching transistor T2 is connected to the second node N2. A first electrode of the storage capacitor C is connected to the first node N1, and a second electrode of the storage capacitor C is connected to the power supply voltage terminal VSS to receive a power supply voltage. A control electrode of the photosensitive transistor ST is connected to the first node N1, a first electrode (for example, a drain electrode) of the photosensitive transistor ST is connected to the second node N2, and a second electrode (for example, a source electrode) of the photosensitive transistor ST is connected to the power supply voltage terminal VSS to receive the power supply voltage. A control electrode of the third switching transistor T3 is connected to the third control terminal G3 to receive a third control signal, a first electrode of the third switching transistor T3 is connected to the second node N2, and a second electrode of the third switching transistor T3 is connected to the read signal terminal OUT to output a sensing electrical signal.

For example, in some embodiments of the present disclosure, the target voltage is equal to a sum of the power supply voltage and the threshold voltage of the photosensitive transistor ST.

According to the embodiments of the present disclosure, the level of the first node N1 is compensated to the target voltage by the compensation sub-circuit, and then the photosensitive sub-circuit senses the intensity of the incident light, so the sensing electrical signal output by the photosensitive sub-circuit is only related to the intensity of the incident light, and is not related to the characteristics of the photosensitive sub-circuit (for example, the threshold voltage of the photosensitive transistor ST, etc.), and the uniformity during detection operation that is performed by a detection device (or a display device) including a plurality of photosensitive circuits can be improved.

Figure 7:
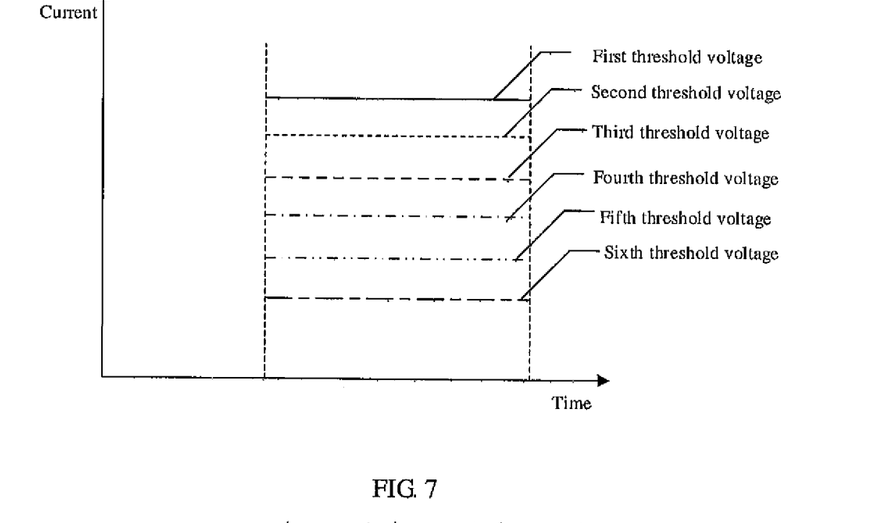
FIG. 7 is a diagram showing a relationship between a threshold voltage and a sensing electrical signal provided by at least one embodiment of the present disclosure.

In addition, FIG. 7 is a diagram showing a relationship between a threshold voltage and a sensing electrical signal provided by the embodiments of the present disclosure. The threshold voltage is, for example, a threshold voltage of the photosensitive transistor ST, and the sensing electrical signal here is, for example, represented by a current. As shown in FIG. 7, six different threshold voltages are shown in the FIG. 7, which are namely the first threshold voltage to the sixth threshold voltage, respectively, and the output currents corresponding to different threshold voltages are different. It should be noted that the embodiment of the present disclosure does not limit the threshold voltage of the photosensitive transistor ST, and the specific value of the threshold voltage can be determined according to actual requirements.

It should be noted that, in the embodiments of the present disclosure, the first switching transistor T1, the second switching transistor T2, and the third switching transistor T3 may all be N-type thin film transistors (or all be P-type thin film transistors), which can simplify the process flow, thereby reducing the process flow for manufacturing a display device (or a detection device) including the photosensitive circuit, and helping to improve the product yield.

In addition, it should be noted that the storage capacitor C in the embodiments of the present disclosure may be a liquid crystal capacitor that is composed of a pixel electrode and a common electrode, or may be an equivalent capacitor composed of a liquid crystal capacitor that is composed of a pixel electrode and a common electrode, and other capacitors, and the embodiments of the present disclosure is not limited to this embodiment.

The operation process of the photosensitive circuit provided by the embodiments of the present disclosure is described in detail below.

Figure 8:
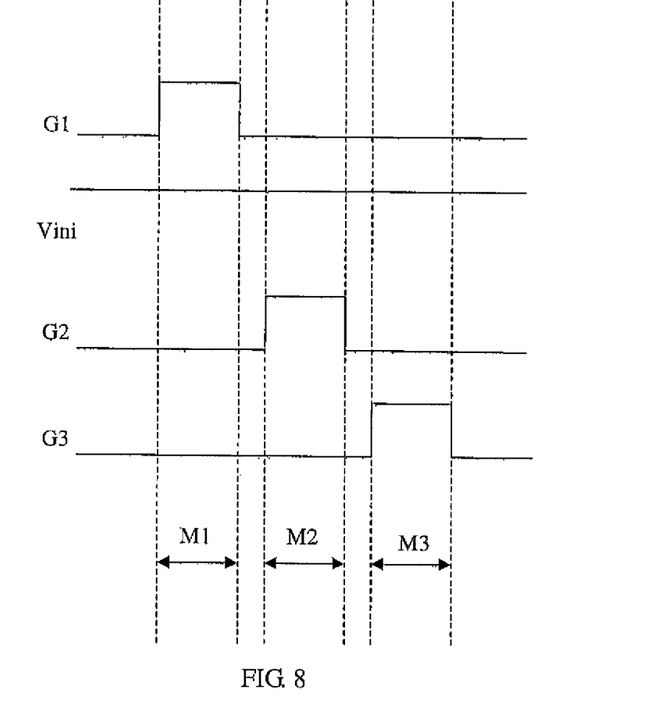
FIG. 8 is an operation timing diagram of a photosensitive circuit provided by at least one embodiment of the present disclosure.
Figure 9:
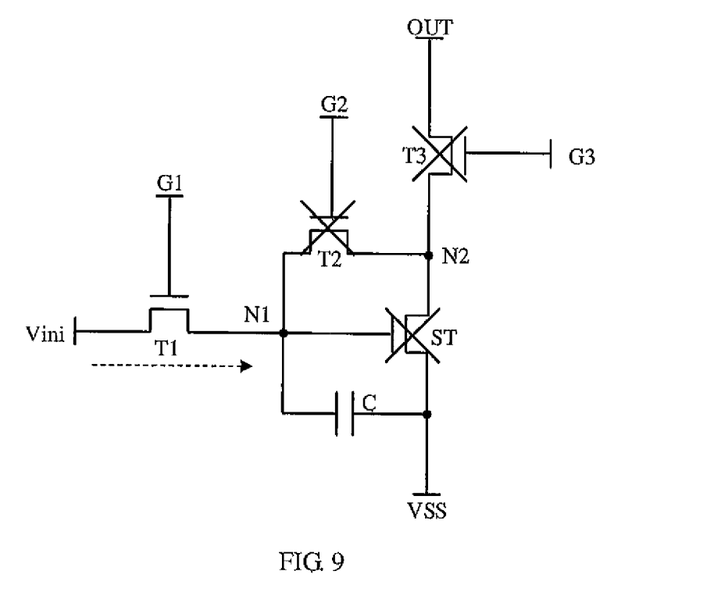
FIG. 9 is an operating state diagram of a photosensitive circuit in an initialization stage provided by at least one embodiment of the present disclosure.
Figure 10:
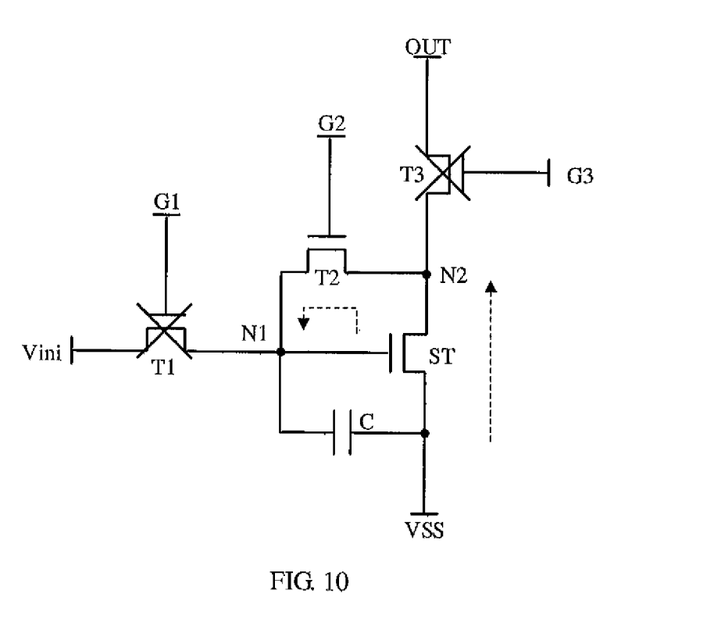
FIG. 10 is an operating state diagram of a photosensitive circuit in a compensation stage provided by at least one embodiment of the present disclosure.
Figure 11:
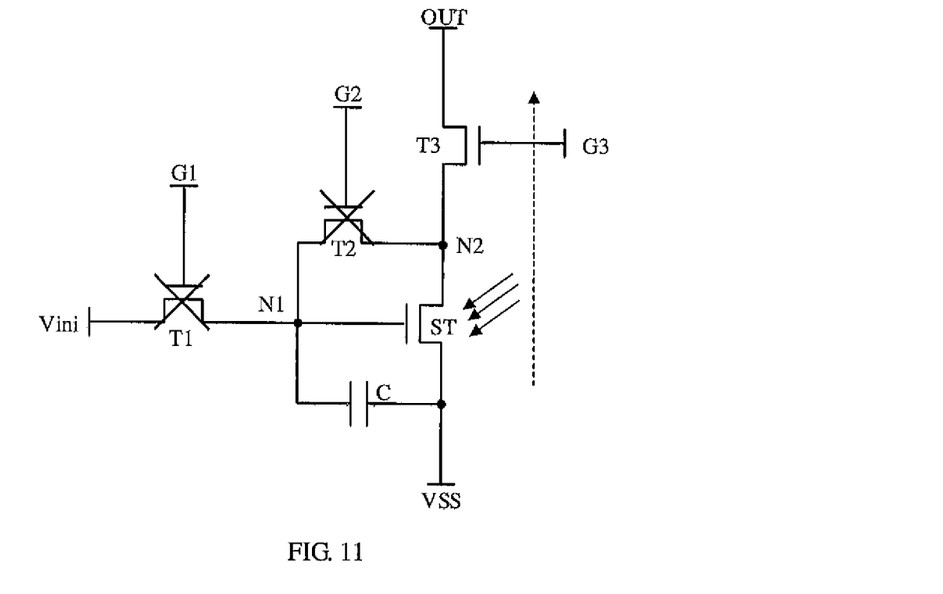
FIG. 11 is an operating state diagram of a photosensitive circuit in a read stage provided by at least one embodiment of the present disclosure.

Taking the switching transistor T1 to the switching transistor T3, and the photosensitive transistor ST in the photosensitive circuit provided by the embodiments of the present disclosure as N-type thin film transistors as an example, FIG. 8 is an operation timing diagram of a photosensitive circuit provided by at least one embodiment of the present disclosure, FIG. 9 is an operating state diagram of a photosensitive circuit in an initialization stage provided by at least one embodiment of the present disclosure, FIG. 10 is an operating state diagram of a photosensitive circuit in a compensation stage provided by at least one embodiment of the present disclosure, and FIG. 11 is an operating state diagram of a photosensitive circuit in a read stage provided by at least one embodiment of the present disclosure.

It should be noted that in FIG. 9-FIG. 11, a transistor indicated by a cross indicates that the transistor is in a turn off state, and a dashed line with an arrow indicates a current direction. As shown in FIG. 6 and FIG. 8-FIG. 11, the photosensitive circuit provided by the embodiment of the present disclosure includes three switching transistors (T1-T3), one photosensitive transistor (ST), one storage capacitor (C), four input terminals (Vini, G1, G2, and G3), one power supply voltage terminal (VSS), and one output terminal (a read signal terminal OUT). For example, the power supply voltage terminal VSS continuously provides a low-level voltage signal. The operation process of the photosensitive circuit includes the following operations.

In an initialization stage M1, as shown in FIG. 8 and FIG. 9, the first control signal provided by the first control terminal G1 is at a high level, the first switching transistor T1 is turned on in response to the first control signal with a high level, and the first switching transistor T1, which is turned on, supplies the initial signal, provided by the initial signal terminal Vini, to the first node N1. For example, the initial signal is at a high level, and the initial signal can charge the storage capacitor C.

In the initialization stage M1, the signals provided by the first control terminal G1 and the initial signal terminal Vini are both at a high level, the signals provided by the second control terminal G2 and the third control terminal G3 are both at a low level, and the signal output by the read signal terminal OUT is at a low level.

In a compensation stage M2, as shown in FIG. 8 and FIG. 10, the second control signal provided by the second control terminal G2 is at a high level, and the second switching transistor T2 is turned on in response to the second control signal with a high level. In this case, the photosensitive transistor ST is diode-connected, so the photosensitive transistor ST is turned on. The power supply voltage with a low level, received by the power supply voltage terminal VSS, is written into the first node N1 through the photosensitive transistor ST and the second switching transistor T2 which are turned on, so the level of the first node N1 is gradually pulled down until the level of the first node N1 is equal to the sum of the threshold voltage of the photosensitive transistor ST and the power supply voltage, and at this time, the photosensitive transistor ST is turned off.

In the compensation stage M2, the signals provided by the second control terminal G2 and the initial signal terminal Vini are at a high level, the signals provided by the first control terminal G1 and the third control terminal G3 are at a low level, and the signal output by the read signal terminal OUT is at a low level. Because the first control signal provided by the first control terminal G1 is at a low level, even if the initial signal provided by the initial signal terminal Vini is still at a high level, the high level will not pull up the level of the first node N1.

In a read stage M3, as shown in FIG. 8 and FIG. 11, the third control signal provided by the third control terminal G3 is at a high level, and the third switching transistor T3 is turned on in response to the third control signal with a high level. When the incident light including, for example, an infrared light, irradiates the photosensitive transistor ST, the photosensitive transistor ST generates a sensing electric signal based on the intensity of the incident light, and supplies the sensing electric signal to the second node N2. Meanwhile, because the third switching transistor T3 is turned on, the sensing electrical signal is transmitted to the read signal terminal OUT through the third switching transistor T3, which is turned on.

In the read stage M3, the signals provided by the third control terminal G3 and the initial signal terminal Vini are at a high level, the signals provided by the first control terminal G1 and the second control terminal G2 are at a low level, and the read signal terminal OUT outputs a sensing electrical signal.

It should be noted that the sensing electrical signal read by the read signal terminal OUT in the photosensitive circuit provided by the embodiments of the present disclosure is only related to an electrical signal, which is between the source electrode of the photosensitive transistor ST and the drain electrode of the photosensitive transistor ST when the photosensitive transistor ST is in an illuminated state.

Figure 12:
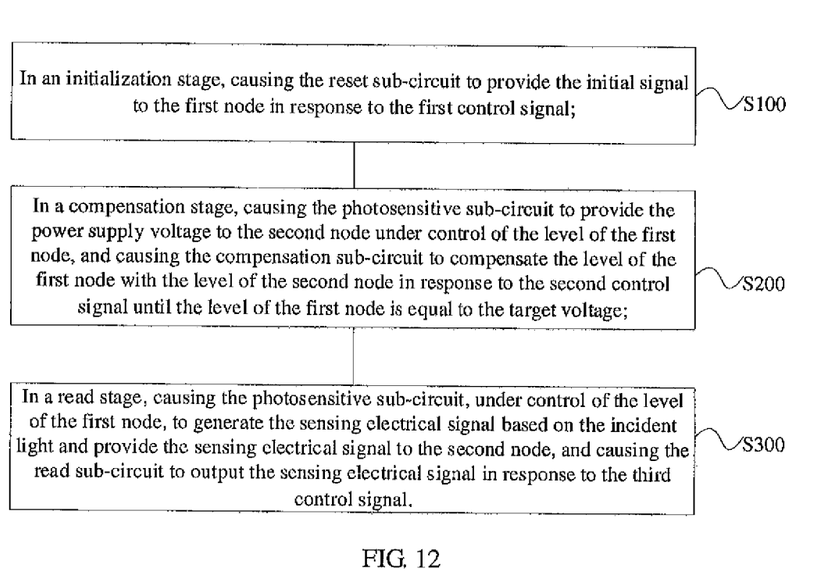
FIG. 12 is a flowchart of a driving method of a photosensitive circuit provided by at least one embodiment of the present disclosure.

At least one embodiment of the present disclosure further provides a driving method of the photosensitive circuit, which can be applied to any one of photosensitive circuits provided by the embodiments of the present disclosure, and the photosensitive circuit includes, for example, a reset sub-circuit, a compensation sub-circuit, a photosensitive sub-circuit, and a read sub-circuit. FIG. 12 is a flowchart of a driving method of a photosensitive circuit provided by at least one embodiment of the present disclosure. As shown in FIG. 12, the driving method includes the following operation steps.

Step S100: in an initialization stage, causing the reset sub-circuit to provide the initial signal to the first node in response to the first control signal.

For example, the first control signal provided by the first control terminal G01 is a pulse signal.

In step S100, the reset sub-circuit pulls up the level of the first node N1 under control of the first control signal provided by the first control terminal G1.

Step S200: in a compensation stage, causing the photosensitive sub-circuit to provide the power supply voltage to the second node N2 under control of the level of the first node N1, and causing the compensation sub-circuit to compensate the level of the first node N1 with the level of the second node N2 in response to the second control signal until the level of the first node N1 is equal to the target voltage.

For example, the second control signal provided by the second control terminal G2 is a pulse signal.

Step S300: in a read stage, causing the photosensitive sub-circuit, under control of the level of the first node N1, to generate the sensing electrical signal based on the incident light and provide the sensing electrical signal to the second node N2, and causing the read sub-circuit to output the sensing electrical signal in response to the third control signal.

For example, the third control signal provided by the third control terminal G3 is a pulse signal.

For example, the incident light includes an infrared light, which may be an infrared light, or may be a light including an infrared light.

By setting the compensation sub-circuit, the embodiments of the present disclosure can ensure that the initial states of a plurality of photosensitive circuits are the same, so the uniformity during detection operation that is performed by a detection device (or a display device) including a plurality of photosensitive circuits can be improved.

For example, in the embodiments of the present disclosure, the target voltage is equal to the sum of the power supply voltage provided by the power supply voltage terminal VSS and the threshold voltage of the photosensitive transistor ST in the photosensitive circuit.

In addition, according to the embodiments of the present disclosure, the level of the first node N1 is compensated to the target voltage by the compensation sub-circuit, and then the photosensitive sub-circuit senses the intensity of the incident light, so the sensing electrical signal output by the photosensitive sub-circuit is only related to the intensity of the incident light, and is not related to the characteristics of the photosensitive sub-circuit (for example, the threshold voltage of the photosensitive transistor ST, etc.), and the uniformity during detection operation that is performed by a detection device (or a display device) including a plurality of photosensitive circuits can be improved.

It should be noted that the detailed description and the technical effect of the driving method can refer to the corresponding description in the above embodiments of the photosensitive circuits.

Figure 13:
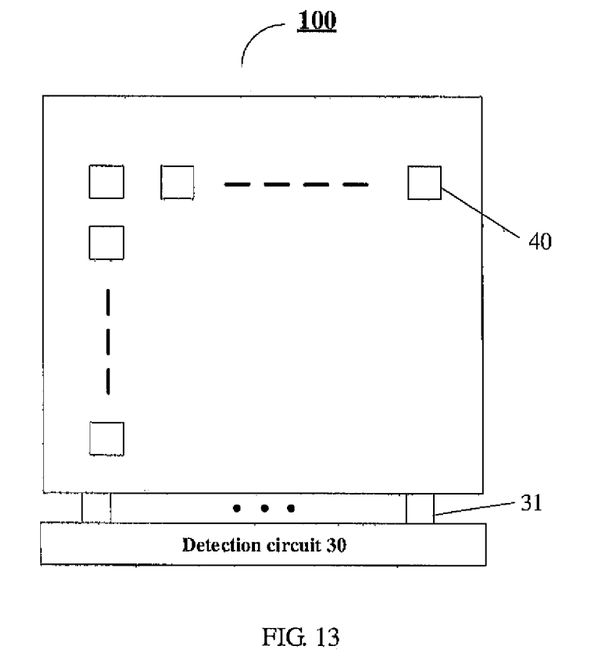
FIG. 13 is a schematic diagram of a detection device provided by at least one embodiment of the present disclosure.

At least one embodiment of the present disclosure further provides a detection device 100, as shown in FIG. 13, which includes a plurality of photosensitive circuits 40. For example, the photosensitive circuit 40 may adopt any one of the photosensitive circuits provided in the above embodiments. For example, the plurality of photosensitive circuits 40 are arranged in an array.

For example, as shown in FIG. 13, the detection device 100 further includes a detection circuit 30, the detection circuit 30 is connected to the photosensitive circuit 40, and is configured to receive a sensing electrical signal. For example, the detection circuit 30 may be connected to the read signal terminal OUT of the photosensitive circuit 40 through a detection line 31 to receive the sensing electrical signal. For example, in the case where the photosensitive circuits 40 are arranged in an array, each column of photosensitive circuits 40 may be correspondingly provided with one detection line 31.

For example, the detection circuit 30 may perform further data processing, after receiving the sensing electrical signal, on the sensing electrical signal. For example, in a case where the detection device 100 is used for vein recognition, the data processing of the sensing electrical signal may include normalization, denoising, filtering enhancement, vein texture segmentation, feature value extraction, etc., so a vein distribution map of a back (or places such as dorsal of finger, ventral of finger, palm, wrist, etc.) of a user's hand can be obtained.

For example, the detection device 100 may further include an identification circuit, and the detection circuit 30 provides the obtained vein distribution map to the identification circuit. For example, the identification circuit may store the identity information of the user in advance, and the identity information of the user may be, for example, a vein distribution map of the user acquired in advance. Therefore, the identification circuit can match the obtained vein distribution map with the vein distribution map stored in advance, and the identity identification is realized. For example, the detection device 100 can be used in various fields such as entrance guard, secure payment, etc.

Figure 14:
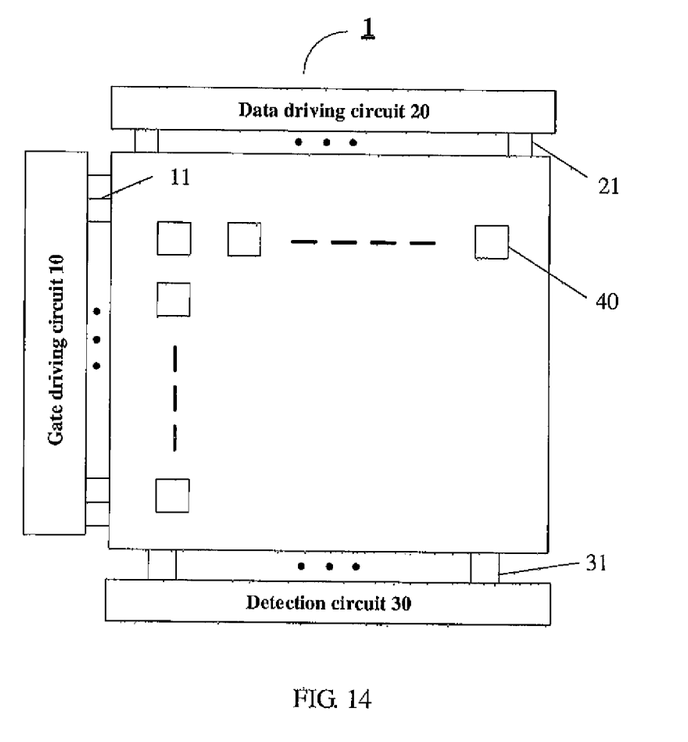
FIG. 14 is a schematic diagram of a display device provided by at least one embodiment of the present disclosure.

At least one embodiment of the present disclosure further provides a display device 1, as shown in FIG. 14, the display device 1 includes a plurality of photosensitive circuits 40. For example, the photosensitive circuit 40 may adopt any one of the photosensitive circuits provided in the above embodiments. For example, the plurality of photosensitive circuits 40 are arranged in an array. For example, in a case where the display device 1 includes a plurality of pixel units that are arranged in an array, the photosensitive circuits 40 may be disposed in the pixel units, respectively, so the display device 1 has both a display function and a photosensitive detection function, simultaneously.

For example, as shown in FIG. 14, the display device 1 may further include a detection circuit 30, the detection circuit 30 is connected to the photosensitive circuit 40, and is configured to receive a sensing electrical signal. For example, the detection circuit 30 may be connected to the read signal terminal OUT of the photosensitive circuit 40 through a detection line 31 to receive the sensing electrical signal. For example, in the case where the photosensitive circuits 40 are arranged in an array, each column of photosensitive circuits 40 may be correspondingly provided with one detection line 31.

For example, the detection circuit 30 may perform further data processing, after receiving the sensing electrical signal, on the sensing electrical signal. For example, in a case where the display device 1 is used for vein recognition, the data processing of the sensing electrical signal may include normalization, denoising, filtering enhancement, vein texture segmentation, feature value extraction, etc., so a vein distribution map of a back (or places such as dorsal of finger, ventral of finger, palm, wrist, etc.) of a user's hand can be obtained.

For example, the display device 1 may further include an identification circuit, and the detection circuit 30 provides the obtained vein distribution map to the identification circuit. For example, the identification circuit may store the identity information of the user in advance, and the identity information of the user may be, for example, a vein distribution map of the user acquired in advance. Therefore, the identification circuit can match the obtained vein distribution map with the vein distribution map stored in advance, and the identity identification is realized. For example, the detection device 100 can be used in various fields such as entrance guard, secure payment, etc.

For example, as shown in FIG. 14, the display device 1 further includes a gate driving circuit 10 and a data driving circuit 20. The gate driving circuit 10 is electrically connected to the photosensitive circuit 40 through a gate line 11, so for example, the first control signal, the second control signal, and the third control signal can be provided. The data driving circuit 20 is electrically connected to the photosensitive circuit 40 through a data line 21, so the initial signal, etc., can be provided, for example.

It should be noted that the detection circuit 30 in the display device 1 provided by the embodiments of the present disclosure can further be integrated with the data driving circuit 20 (or the gate driving circuit 10) in one circuit, thus simplifying the layout of the display device 1, and reducing the cost.

In addition, it should be noted that the display device 1 in the embodiments of the present disclosure may be any product or component having a display function such as a liquid crystal panel, a liquid crystal television, a display, an OLED panel, an OLED television, an electronic paper display device, a mobile phone, a tablet computer, a notebook computer, a digital photo frame, a navigator, etc. The display device 1 may further include other conventional components such as a display panel, and the embodiments of the present disclosure are not limited thereto.

The technical effect of the display device 1 provided by at least one embodiment of the present disclosure may refer to the corresponding description of the photosensitive circuit in the above embodiments, and will not be described here again.

The display device provided by at least one embodiment of the present disclosure may be fabricated by, for example, a Low Temperature Poly-silicon (LTPS) technology, and the design of a plurality of transistors and a plurality of capacitors will not affect the aperture ratio of the display module.

What are described above is related to illustrative embodiments of the disclosure only, and not limitative to the protection scope of the present disclosure. The protection scope of the present disclosure should be defined by the accompanying claims.

What is claimed is:

1. A photosensitive circuit, comprising a reset sub-circuit, a compensation sub-circuit, a photosensitive sub-circuit, and a read sub-circuit,
wherein the reset sub-circuit is configured to provide an initial signal to a first node in response to a first control signal;
the compensation sub-circuit is configured to compensate a level of the first node with a level of a second node in response to a second control signal;
the photosensitive sub-circuit is configured to receive incident light, supply a power supply voltage to the second node under control of the level of the first node, generate a sensing electrical signal based on the incident light, and provide the sensing electrical signal to the second node; and
the read sub-circuit is configured to output the sensing electrical signal in response to a third control signal;
the photosensitive sub-circuit comprises a photosensitive transistor,
a control electrode of the photosensitive transistor is connected with the first node, a first electrode of the photosensitive transistor is connected with the second node, and a second electrode of the photosensitive transistor is connected with a power supply voltage terminal;
wherein the compensation sub-circuit is configured to compensate the level of the first node until the level of the first node is equal to a target voltage, and the target voltage is equal to a sum of the power supply voltage and a threshold voltage of the photosensitive transistor.

2. The photosensitive circuit according to claim 1, wherein the reset sub-circuit is connected with a first control terminal, an initial signal terminal, and the first node,
the first control terminal is configured to provide the first control signal, and
the initial signal terminal is configured to provide the initial signal.

3. The photosensitive circuit according to claim 2, wherein the reset sub-circuit comprises a first switching transistor,
a control electrode of the first switching transistor is connected with the first control terminal, a first electrode of the first switching transistor is connected with the initial signal terminal, and a second electrode of the first switching transistor is connected with the first node.

4. The photosensitive circuit according to claim 1, wherein the compensation sub-circuit is connected with the first node, the second node, a second control terminal, and the power supply voltage terminal,
the second control terminal is configured to provide the second control signal, and
the power supply voltage terminal is configured to provide the power supply voltage.

5. The photosensitive circuit according to claim 4, wherein the compensation sub-circuit comprises a second switching transistor and a storage capacitor,
a control electrode of the second switching transistor is connected with the second control terminal, a first electrode of the second switching transistor is connected with the first node, and a second electrode of the second switching transistor is connected with the second node; and
a first electrode of the storage capacitor is connected with the first node, and a second electrode of the storage capacitor is connected with the power supply voltage terminal.

6. The photosensitive circuit according to claim 1, wherein the photosensitive sub-circuit is connected with the first node and the second node,
in a case where the compensation sub-circuit is connected with a power supply voltage terminal, the photosensitive sub-circuit is further connected with the power supply voltage terminal.

7. The photosensitive circuit according to claim 1, wherein the read sub-circuit is connected with the second node, a third control terminal, and a read signal terminal,
the third control terminal is configured to provide the third control signal, and
the read signal terminal is configured to output the sensing electrical signal.

8. The photosensitive circuit according to claim 7, wherein the read sub-circuit comprises a third switching transistor,
a control electrode of the third switching transistor is connected with the third control terminal, a first electrode of the third switching transistor is connected with the second node, and a second electrode of the second switching transistor is connected with the read signal terminal.

9. The photosensitive circuit according to claim 1, wherein the first electrode of the photosensitive transistor is a drain electrode of the photosensitive transistor, and the second electrode of the photosensitive transistor is a source electrode of the photosensitive transistor.

10. The photosensitive circuit according to claim 1,
wherein the reset sub-circuit is connected with a first control terminal, an initial signal terminal, and the first node, the first control terminal is configured to provide the first control signal, and the initial signal terminal is configured to provide the initial signal;
the compensation sub-circuit is connected to the first node, the second node, a second control terminal, and a power supply voltage terminal, the second control terminal is configured to provide the second control signal, and the power supply voltage terminal is configured to provide the power supply voltage;
the photosensitive sub-circuit is connected with the first node, the second node, and the power supply voltage terminal; and
the read sub-circuit is connected with the second node, a third control terminal, and a read signal terminal, the third control terminal is configured to provide the third control signal, and the read signal terminal is configured to output the sensing electrical signal.

11. The photosensitive circuit according to claim 10, wherein the reset sub-circuit comprises a first switching transistor, the compensation sub-circuit comprises a second switching transistor and a storage capacitor, the photosensitive sub-circuit comprises a photosensitive transistor, and the read sub-circuit comprises a third switching transistor;
- a control electrode of the first switching transistor is connected with the first control terminal, a first electrode of the first switching transistor is connected with the initial signal terminal, and a second electrode of the first switching transistor is connected with the first node;
- a control electrode of the second switching transistor is connected with the second control terminal, a first electrode of the second switching transistor is connected with the first node, and a second electrode of the second switching transistor is connected with the second node;
- a first electrode of the storage capacitor is connected with the first node, and a second electrode of the storage capacitor is connected with the power supply voltage terminal;
- a control electrode of the photosensitive transistor is connected with the first node, a first electrode of the photosensitive transistor is connected with the second node, and a second electrode of the photosensitive transistor is connected with the power supply voltage terminal; and
- a control electrode of the third switching transistor is connected with the third control terminal, a first electrode of the third switching transistor is connected with the second node, and a second electrode of the third switching transistor is connected with the read signal terminal.

12. The photosensitive circuit according to claim 1, wherein the incident light comprises an infrared light, and the photosensitive sub-circuit is configured to generate the sensing electrical signal based on the infrared light.

13. A detection device, comprising a plurality of photosensitive circuits according to claim 1,
wherein the plurality of photosensitive circuits are arranged in an array.

14. The detection device according to claim 13, further comprising a detection circuit,
wherein the detection circuit is connected with the photosensitive circuit, and configured to receive the sensing electrical signal.

15. A display device, comprising a plurality of photosensitive circuits according to claim 1,
wherein the plurality of photosensitive circuits are arranged in an array.

16. A driving method of the photosensitive circuit according to claim 1, the driving method comprising:
- in an initialization stage, causing the reset sub-circuit to provide the initial signal to the first node in response to the first control signal;
- in a compensation stage, causing the photosensitive sub-circuit to provide the power supply voltage to the second node under control of the level of the first node, and causing the compensation sub-circuit to compensate the level of the first node with the level of the second node in response to the second control signal until the level of the first node is equal to the target voltage; and
- in a read stage, causing the photosensitive sub-circuit, under control of the level of the first node, to generate the sensing electrical signal based on the incident light and provide the sensing electrical signal to the second node, and causing the read sub-circuit to output the sensing electrical signal in response to the third control signal.

17. The driving method according to claim 16, wherein in a case where the photosensitive sub-circuit comprises a photosensitive transistor,
the target voltage is equal to a sum of the power supply voltage and a threshold voltage of the photosensitive transistor.

* * * * *